INVENTOR.
Marvin C. Mescher

April 27, 1965 M. C. MESCHER 3,180,244
EVAPORATIVE COOLER FOR TRUCKS
Filed April 16, 1962 2 Sheets-Sheet 2
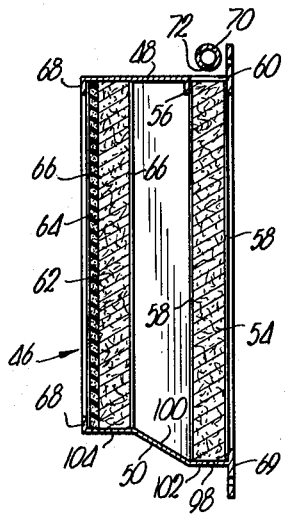
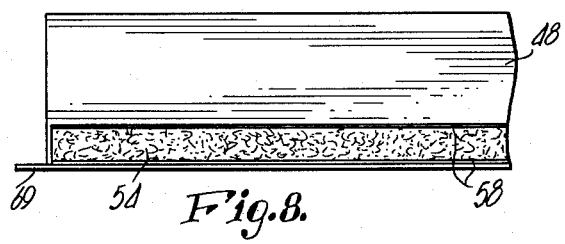
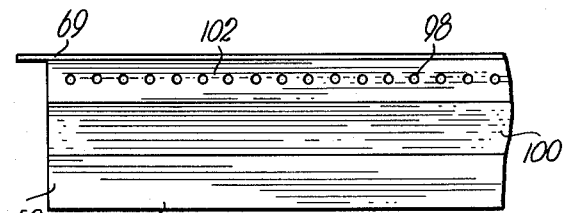
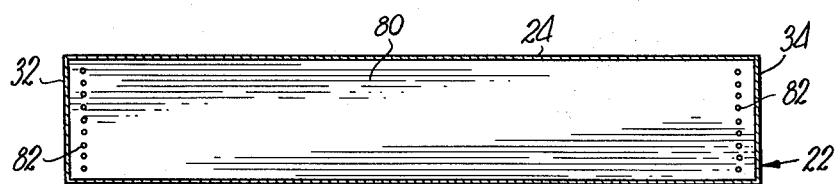
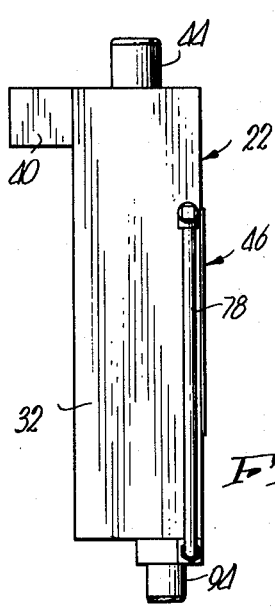
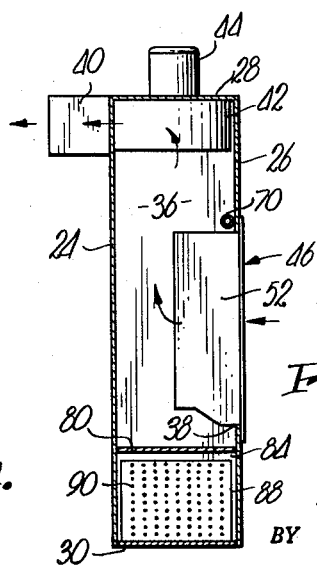
INVENTOR.
Marvin C. Mescher
BY
Hovey, Schmidt, Johnson & Hovey.
ATTORNEYS.

United States Patent Office

3,180,244
Patented Apr. 27, 1965

3,180,244
EVAPORATIVE COOLER FOR TRUCKS
Marvin C. Mescher, Kansas City, Mo., assignor to P-D-M Enterprises, Inc., North Kansas City, Mo., a corporation of Missouri
Filed Apr. 16, 1962, Ser. No. 187,729
4 Claims. (Cl. 98—2)

This invention relates to evaporative air cooling devices utilizing a cooling fluid, such as water or the like, for cooling air by evaporation. More specifically, this invention relates to a cooling device of the type described to be utilized with a vehicle such as a truck having a cab provided with an opening in a rear wall thereof.

Air cooling devices for vehicles generally utilize the ram air pressure created by the movement of the vehicle for creating a flow of air through a housing and through moistened material in the housing for cooling by evaporation prior to the movement of the cooled air into the vehicle itself. This is accomplished by mounting the housing on the side or front of the vehicle where it is directly in line with the air ahead of the vehicle.

Although such devices have proven satisfactory in a number of instances, certain objections thereto have been raised which militate against effective cooling of the air while keeping maintenance thereof to a minimum. For instance, the specific positions of devices heretofore utilized, gives rise to the problem of the collection of bugs and insects at the inlet sides of the housings so that after prolonged use, the inlet is substantially blocked and must be cleaned before further use. Furthermore, at relatively high speeds of the vehicle, the ram air pressure is sufficient to create a blast of moisture-laden air directed into the interior of the vehicle to the discomfort of the driver and passengers of the vehicle itself. The problem is particularly acute in truck cabs having sleeper bunks because of the necessity of directing relatively large amounts of the cool air into the sleeper portion of the cab in order to effectively cool this area sufficient to permit the occupant of the bunk to sleep, notwithstanding relatively ambient temperatures. It can be recognized that truck cabs are very difficult to cool because of the efficient heat radiation through the metal surfaces of the cab and the relatively small volume of the bunk area of the truck cab. Although vent means has been provided for these devices, the presence of such vent means reduces the cooling effect of the air inside the vehicle by reducing the amount of cooled air directed thereinto rather than the reduction of the rate at which air is directed into the vehicle.

The principal defect of the prior devices heretofore utilized involved the direction of air into the vehicle while the relatively cool air was still heavily laden with particles of water and thereby disconcerting to the driver, as well as passengers of the vehicle, particularly drivers attempting to sleep in a sleeper bunk.

The present invention provides an evaporative air cooling device for a vehicle, preferably a truck or the like having a cab provided with a rear wall, the cooling device being mounted on the rear wall out of the main air stream past the vehicle during advancement thereof so that the cooling device is not subjected to ram air action tending to cause the cool air directed into the cab being filled with droplets of water.

The instant cooling device is provided with means for creating a flow of air within a hollow housing having vertically spaced openings therein providing inlet and outlet openings therefor. The flow of air is from the lower of the openings to the upper of said openings so that moisture or foreign matter carried by the air in said flow is caused to separate from the air and gravitate to the bottom of the housing. Means is provided for disposing a cooling fluid, such as water or the like, across the path of flow of the air so that the air is caused to contact the cooling fluid and to be cooled by the latter upon evaporation of said fluid. It is, therefore, clear that the problems occuring from the use of ram air pressure to create the flow of air through the housing, and of directing moisture-laden air into the vehicle, are overcome by the use of the present cooling device.

It is, therefore, the primary object of the present invention to provide a cooling unit for a vehicle or the like to be mounted out of the path of oncoming air relative to the vehicle as the later moves, and wherein the cooling unit is provided with unique structure therein for directing cool air into the interior of the vehicle, but in a substantially dry condition so that the occupants of the vehicle are not subjected to moisture-laden air, but with the cool air being forced into the vehicle at a sufficient rate to effectively cool the entire interior of the vehicle.

Another object of the present invention is the provision of an air cooling unit for use with a vehicle, and which includes a housing having vertically spaced openings therein providing an inlet and an outlet therefor, the lower of the openings being the inlet, whereby droplets of water and foreign particles are caused to gravitate out of the air as the latter moves upwardly from the inlet to the outlet thereof to preclude the foreign materials and water droplets from entering the vehicle.

Still another object of the present invention is the provision of novel filter means designed for placement within the housing across the path of travel of the air, and wherein the filter means includes a first layer of absorbent material to "scrub" the air and remove the moisture therefrom, and a second layer of porous, celular material disposed for trapping foreign particles carried by the air, whereby the air is effectively dried and cleansed prior to the passage of the air from the housing through the outlet and into the interior of the vehicle.

Still another object of the present invention is the provision of an air cooling unit of the type described, and wherein is included a reservoir for containing a cooling fluid, such as water or the like, said reservoir having perforated baffle structure therein to prevent uncontrolled movement of the water as the vehicle travels over rough terrain whereby the water is prevented from moving into the path of flow of the air by sloshing, and thus the moisture content of the air is maintained at a minimum at all times to enhance the comfort of the individuals within the vehicle and cooled by the air from said cooling unit.

A further object of the present invention is the provision of a cooling unit of the character described, wherein the parts required in the assembly of the unit may be readily obtained and at a minimum of cost, whereby the overall expense of manufacturing and installing the cooling unit is maintained at a minimum, while providing a device capable of effectively cooling vehicles having varying cooling requirements.

Yet another object of the present invention is the provision of a cooling unit of the type described which is particularly adapted to be mounted on the rear wall of the cab of a truck or the like, and which does not require additional space for mounting or installation on the cab, whereby modifications to the positions of the loads carried by the truck are not required and the cooling unit may be mounted on existing trucking equipment.

Other objects of the present invention will become apparent as the following specification progresses, reference being had to the accompany drawing, wherein:

FIG. 4 is a side elevational view of the cooling unit and illustrating fluid delivery means therefor for conveying a cooling fluid such as water or the like to a position above the inlet opening thereof;

FIG. 5 is a cross-sectional view taken along line 5—5 of FIG. 2;

FIG. 6 is a cross-sectional view taken along line 6—6 of FIG. 2;

FIG. 7 is a cross-sectional view taken through the filter element which forms a part of the instant invention and illustrating the means for disposing a cooling fluid across the path of travel of air flowing through the filter element;

FIG. 8 is a fragmentary, plan view of the filter element illustrated in FIG. 7 and looking from above the element; and FIG. 9 is a fragmentary, plan view of the bottom of the filter element and illustrating the apertures therein for permitting the gravitation of cooling fluid to a reservoir normally positioned below the element.

Figure 1:
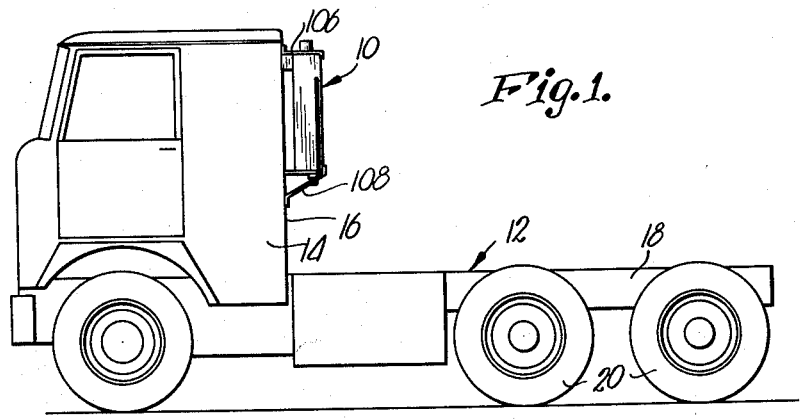
FIGURE 1 is a side elevational view of a truck having a cab and illustrating a cooling unit which forms the subject of the present invention operably coupled to the rear wall of the cab in fluid communication with the interior of the latter.

The present invention comprises a cooling unit having a housing provided with a pair of vertically spaced openings therein providing an inlet at the lower end thereof and an outlet at the top portion of the housing. Blower means is disposed within the housing for creating a flow of air from the inlet to the outlet, and filter means is positioned across the path of flow of the air to filter the air as the same passes toward the outlet. The filter means includes a first layer of absorbent material capable of "scrubbing" the air and removing droplets of water entrained in the air, and a second layer of porous, cellular material adapted to trap foreign particles carried by the air.

A reservoir for receiving a cooling fluid, such as water or the like, is carried by the housing below the inlet opening and is operably coupled to fluid distribution means in the nature of a perforated pipe disposed above a layer of fluid-absorbing material, the latter being disposed across the path of travel of the air. Baffle structure is disposed within the reservoir for preventing sloshing of the cooling fluid carried by the reservoir, and such structure includes a series of interconnected, perforated plates which divide the reservoir into a number of interconnected compartments.

The cooling unit which forms the subject of this invention, is denoted by the numeral 10 and is adapted to be utilized with a vehicle and in the preferred embodiment, is utilized with a truck 12 having a cab 14 provided with a rear wall 16 extending upwardly from a pair of frame supports 18 on which are rotated a number of ground-engaging wheels 20. Unit 10 is normally adapted to be secured to rear wall 16 of cab 14 and placed in fluid communication with the interior of cab 14 for cooling the air therewithin.

Figure 3:
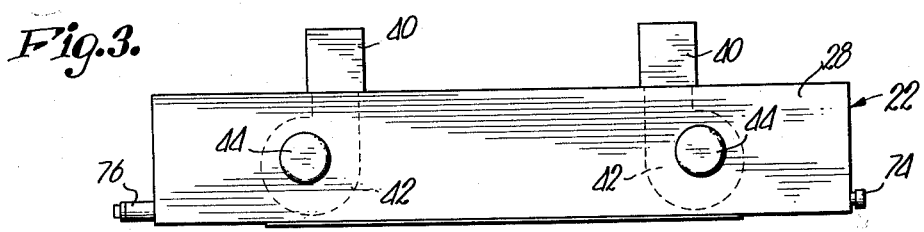
FIG. 3 is a plan view of the cooling unit illustrated in FIG. 2 and further showing the positions of the blower units which operate to create a flow of air within the housing forming a part of the unit.
Figure 2:
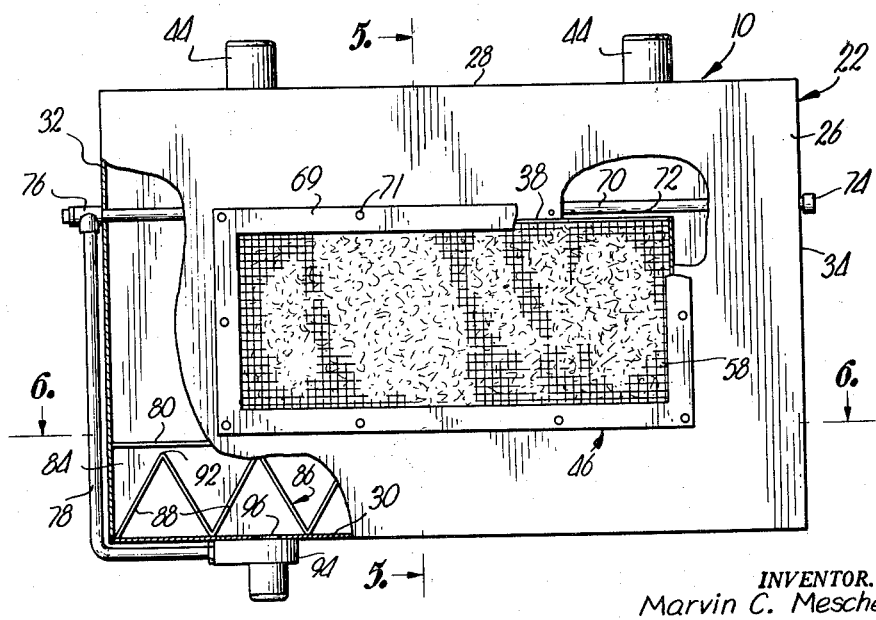
FIG. 2 is a rear elevational view of the cooling unit, parts being broken away and in section to illustrate details of construction.

Unit 10 as illustrated in FIGS. 2 and 3, comprises a generally polygonal housing 22 having a front wall 24, a rear wall 26, a top wall 28, a bottom wall 30, and a pair of opposed side walls 32 and 34, walls 24 to 34 inclusive being interconnected to form an enclosed space 36 within housing 22.

Rear wall 26 is provided with a generally rectangular opening 38 as illustrated in FIG. 5 for providing an air inlet for housing 22. Front wall 24 is provided with a pair of openings (not shown) therein adjacent the interconnection thereof with top wall 28. The openings in front wall 24 are generally horizontally spaced, and a pair of conduits 40 are secured to wall 24 and extend outwardly therefrom in surrounding relationship to the openings therein, said openings in front wall 24 presenting outlets for housing 22. A pair of blowers 42 is secured to top wall 28 and each of blowers 42 is provided with an air inlet side in communication with space 36 and an air outlet side coupled with a corresponding opening in front wall 24. Top wall 28 is provided with openings for permitting the motors 44 of blowers 42 to project upwardly and outwardly from housing 22. Motors 44 are, therefore, in contact with the air surrounding housing 22 and are cooled by the air during operation thereof.

Filter means 46 is disposed within housing 22 adjacent inlet opening 38 thereof. Filter means 46 comprises a frame having a top wall 48, a bottom wall 50, and a pair of opposed side walls 52 interconnecting opposed margins of top and bottom walls 48 and 50. A first layer 54 of absorbent material, such as excelsior or the like, is disposed adjacent the normally rearmost extremity of the frame formed by walls 48, 50 and 52 in closing relationship to the passage formed by the configuration of the frame. A length 56 of rigid material spans the distance between the margins of top wall 48 to provide a guide for layer 54 to position the latter across the open end of the frame. A pair of opposed, spaced sheets 58 of expanded metal, are disposed on opposed sides of layer 54 to prevent the collapse of the material and thereby render the latter sufficiently rigid to be maintained in position across the corresponding open end of the frame. As illustrated in FIG. 2, one sheet 58 of expanded metal is shown in the form of a grid across the opening 38 formed in rear wall 26. It is noted that a longitudinally extending opening 60 is disposed within top wall 48 directly above layer 54 for a purpose to be described.

Spaced forwardly of layer 54 is a pair of layers 62 and 64 of absorbent material for filtering the air passing forwardly of layer 54. Layer 62 comprises excelsior material in the same manner as layer 54, and layer 64 comprises synthetic resin material in the nature of a foam. Layers 62 and 64 are held in engagement by sheets 66 of expanded material in the same manner as layer 54 is held in a position preventing collapse of the latter. A peripheral flange 68 is secured to top and bottom walls 48 and 50 and side walls 52 of the frame forming filter means 46 to hold layers 62 and 64 in position within the frame in spaced relationship to layer 54. A rectangular frame 69 is secured to the rearmost margins of top and bottom walls 48 and 50 and side walls 52 of the frame of filter means 46 and provide means for securing filter means 46 to rear wall 26. Frame 69 is shown with a plurality of screw holes 71 for attaching frame 69 to rear wall 26.

An elongated pipe 70 spans the distance between side walls 32 and 34 of housing 22 and is provided with a number of downwardly directed perforations 72 therein as illustrated in FIG. 2. Pipe 70 is mounted above filter means 46 as illustrated in FIG. 7 and perforations 72 are disposed for directing a cooling fluid, such as water or the like, downwardly through opening 60 and onto layer 54 of the absorbent material for moistening the material. Pipe 70 projects outwardly from side walls 32 and 34 and a cap 74 covers one end of pipe 70 adjacent side wall 34 and a T 76 is secured to the opposite end of pipe 70. An L-shaped pipe 78 is secured to T 76 and extends downwardly and below the bottom wall 30 of housing 22. A baffle plate 80 spans the distance between side walls 32 and 34 of housing 22 below inlet opening 38 and above bottom wall 30 as illustrated in FIGS. 2 and 5. Plate 80 is provided with a row of perforations 82 therein adjacent each end thereof as illustrated in FIG. 6. Plate 80, therefore, separates space 36 from a chamber 84 which defines a reservoir for cooling fluid to be directed toward and into pipe 70.

Baffle structure, broadly denoted by the numeral 86, is disposed within reservoir 84 to prevent sloshing of fluid within the latter. Structure 86 includes a number of interconnected, perforated plates 88 arranged in inclined positions and connected at proximal margins thereof to form a saw-tooth configuration within reservoir 84, as illustrated in FIG. 2. The perforations 90 in plates 88, permit the fluid within reservoir 84 to move therewithin while remaining substantially unagitated, especially when truck 12 moves over rough terrain. The baffle structure 86 formed by plates 88, substantially spans the distance between side walls 32 and 34 of housing 22, and the junctions 92 of plates 88 are positioned directly below the lower surface of plate 80.

A variable displacement pump 94 is secured to the bottom wall 30 in any suitable manner and communicates with an opening 96 in bottom wall 30 for directing fluid carried by reservoir 84 into pipe 78 and then into pipe 70 for delivery through perforations 72 and to layers 54.

It is to be noted that bottom wall 50 of the frame defining filter means 46, is provided with a number of openings 98 therein for permitting fluid passing through layer 54 to gravitate to the top surface of plate 80. Thereupon, the fluid then gravitates through perforations 82 of plate 80 into reservoir 84 to be recirculated in the manner set forth. Bottom wall 50 is provided with an inclined portion 100 interconnecting the portions 102 and 104 thereof which provide supports for layer 54 and layer 62 respectively. Portion 100, therefore, prevents moisture from splashing up into the region between layers 54 and 62 when the fluid strikes the top surface of plate 80. Further, portion 100 causes the lower margins of layers 62 and 64 to be above the lower margin of layer 54 so that the fluid cannot contact the air passing out of layers 64 and into space 36 by the striking of the fluid on the top surface of plate 80.

In operation, housing 22 is disposed on rear wall 16 of truck 12 by virtue of a pair of vertically spaced brackets 106 and 108, as illustrated in FIG. 1. Control means is provided within cab 14 for actuating blowers 42 and pump 94 to actuate unit 10 when it is desired to cool the interior of cab 14. With cooling fluid, such as water or the like, disposed within reservoir 84, actuation of pump 94 will cause fluid to be directed into pipe 70 and onto layer 54 across the inlet opening 38. The fluid will then gravitate through layer 54 toward the openings 98 in bottom wall 50 and the air which is directed into housing 22 under the suction action of blowers 42, is caused to contact the fluid within layer 54. If the fluid be water, for instance, the water evaporates upon contact with the air and as a result, the air is cooled prior to movement toward the layers 62 and 64.

As the air enters layer 62, the air is "scrubbed" or "stripped" of water to thereby dry the air prior to movement into layer 64. The movement of the air through layer 64 traps the foreign particles, such as dust or the like, carried by the air so that the air emerging from layer 64 is substantially clean prior to the movement of the air through space 36 and into the inlet openings of blowers 42.

It is noted that air is caused to move upwardly toward the blowers 42 after emerging from layer 64 and therefore, if any water particles pass through layers 62 and 64, the particles will gravitate to plate 80 as the air moves upwardly under the action of the blowers 42. The Z-shaped path of the air therefore, is advantageous in drying the air further so that when the air issues from conduit 40 into the cab 14, the air will be substantially dry and the moisture content of the air within cab 14 will then be kept at a minimum to enhance the comfort of the driver and particularly a person occupying the sleeper bunk within the cab 14 behind the driver's seat.

Since energizing of blowers 42 causes heat to be produced in motors 44 thereof, it is noted that motors 44 are cooled by the air passing thereby when truck 12 is in motion. Therefore, the heat generated within motors 44 does not contribute to heating the air within space 36.

Unit 10 provides a cooling device for a vehicle and, in the embodiment shown, for cab 14 of truck 12 at the rear wall 16 thereof. Unit 10 effectively dries and cleans the air after the same has been cooled and prior to the introduction of the cooled air into cab 14. Furthermore, the cooling fluid is recirculated until the supply thereof is exhausted and the fluid is prevented from sloshing within reservoir 84 by virtue of the baffle structure 86 therewithin. It can be recognized that unit 10 provides a simple, inexpensive, quickly installed device for cooling cab 14 which requires little or no modification thereto, and which is substantially compact and can be easily fitted into space now provided on most vehicles, especially of the truck type which pull large trailers behind the cabs thereof. In fact, rear wall 26 of unit 10 is spaced no further away from the rear wall 16 of cab 14 than the rearmost extremity of a muffler tube commonly associated with a vehicle of the type illustrated in FIG. 1.

Access to filter means 46 may be had by removing the frame formed by walls 48, 50 and 52 from housing 22 and then individually removing one of the side walls 52 to permit layers 54, 62 and 64 to be shifted laterally and out of the air path formed through the frame.

Having thus described the invention, what is claimed as new and desired to be secured by Letters Patent is:

1. In a truck having a cab provided with a rear wall and an opening therethrough in said rear wall thereof, the combination with said cab of:

(a) an evaporative air-cooling unit carried by said cab for directing air into the cab through said opening, said unit comprising a housing secured to said rear wall and extending rearwardly therefrom, said housing having an air inlet and an air outlet spaced and forwardly of said inlet, said outlet being in fluid communication with said opening;

(b) means carried by said housing for creating a flow of air from said inlet to said outlet, said flow being generally upwardly in the housing;

(c) filter means between said inlet and outlet for filtering the air in said flow; and (d) means carried by said housing for disposing an evaporative fluid within the path of said flow, whereby the air passing in contact with the evaporative fluid is cooled upon evaporation of said fluid and said cooled air is directed into said cab.

2. In a truck having a cab provided with a rear wall and an opening therethrough in said rear wall thereof;

(a) an evaporative air-cooling unit for said cab for cooling the interior thereof, said unit comprising a housing secured to said rear wall and extending rearwardly therefrom, said housing having an air inlet and an air outlet spaced above and forwardly of said inlet, said outlet adapted to be disposed in fluid communication with said opening;

(b) means in said housing for creating a flow of air from said inlet to said outlet, said flow being generally upwardly in the housing;

(c) filter means within said housing between said inlet and outlet for filtering the air in said flow;

(d) a reservoir carried by said housing below said inlet and adapted to contain a supply of evaporative fluid, said reservoir having baffle means thereon to prevent the sloshing of cooling fluid contained thereby, said baffle means including a plurality of plates disposed at an angle with respect to the horizontal; and (e) means on said housing adjacent said inlet and operably coupled with said reservoir for disposing said evaporative fluid within the path of said flow, whereby the air passing in contact with said evaporative fluid is cooled upon the evaporation of the latter and subsequently filtered prior to passing out of the housing through said outlet.

3. In an evaporative air-cooling unit having a housing provided with spaced inlet and outlet openings, means within said housing for creating a flow of air from said inlet opening to said outlet opening, and means for disposing an evaporative fluid within the path of said flow, the improvement of which comprises:
   (a) a reservoir adapted to be secured to said housing in fluid communication therewith below the inlet and outlet openings thereof, said reservoir adapted to contain said cooling fluid and to be operably coupled with said fluid disposing means for supplying evaporative fluid to the latter; and
   (b) baffle structure within said reservoir for preventing sloshing of said evaporative fluid therein, said structure comprising a number of perforated plates dividing said reservoir into a number of interconnected compartments, adjacent plates being interconnected at proximal marginal edges thereof to form a member of saw-tooth configuration spanning the distance between opposed ends of said reservoir.

4. In an evaporative air-cooling unit having a housing provided with spaced inlet and outlet openings, means within said housing for creating a flow of air from said inlet opening to said outlet opening and means adjacent the inlet for distributing a fluid to be evaporated in the flow, filter means adapted to be disposed within said housing across the path of said flow for filtering the air in said flow, said filter means including:
   (a) a first layer of fluid-permeable material adjacent said inlet opening and below the distributing means in disposition to receive the fluid from the distributing means for conducting the fluid across said inlet opening as the fluid gravitates through said material;
   (b) a second layer of fluid-permeable, absorbent material spaced from said first layer for removing the moisture from the air; and
   (c) a third layer of porous, cellular material adjacent the second layer disposed for trapping the foreign particles carried by said air.

References Cited by the Examiner
UNITED STATES PATENTS

| | | | |
|---|---|---|---|
| 2,054,200 | 9/36 | Langford | 98—2.5 |
| 2,500,527 | 3/50 | De Muth | 98—2.5 |
| 2,631,829 | 3/53 | Carraway | 261—98 |
| 2,648,272 | 8/53 | Norton | 98—2.5 |
| 2,829,732 | 4/58 | Goettl | 261—97 |
| 2,838,130 | 6/58 | Lemmon | 98—2.5 |
| 2,959,032 | 11/60 | Davis | 62—314 |
| 3,057,171 | 10/62 | Hulse et al. | 62—244 |
| 3,075,750 | 1/63 | Goettl | 261—97 |

ROBERT A. O'LEARY, *Primary Examiner.*